STEREOPHONIC SOUND

Filed March 25, 1947

GILLES HOLST
INVENTOR.

BY [signature]

ATTORNEY.

Patented Jan. 23, 1951

2,538,869

UNITED STATES PATENT OFFICE 2,538,869

STEREOPHONIC SOUND

Gilles Holst, Eindhoven, Netherlands, assignor to Hartford National Bank and Trust Company, Hartford, Conn., as trustee Application March 25, 1947, Serial No. 737,010
In the Netherlands March 14, 1946

Section 1, Public Law 690, August 8, 1946
Patent expires March 14, 1966

6 Claims. (Cl. 179—100.3)

The invention relates to a method of successively scanning two or more oscillation records, for example sound tracks, which are arranged in parallel relation on a single carrier. Oscillation records as above referred to occur, for example, when stereophonic records or push-pull records are made and, in general, when a plurality of oscillation tracks and, as the case may be, control tracks acting thereon are required to be reproduced simultaneously.

The method according to the invention is characterized in that all the records are successively scanned at a high frequency rate and that the current pulses thus obtained which originate from each of the records, are combined to form a single signal and are pre-amplified, whereupon this signal is divided into its components in accordance with the number of records scanned. This time division may be effected in the manner known already from the multiplex telephony technique wherein a number of conversations are held through one channel, for example by means of multivibrator circuits. Alternatively, use may be made of a multi-anode cathode ray beam tube the electron beam of which is caused to impinge, in synchronism with the scanning frequency, successively on the first, second and following anodes of the tube, the number of anodes depending on the number of tracks on the carrier signals, whereupon the individual components thus obtained are separately amplified and led to the respective reproducing devices.

By carrying out the method according to the invention, in addition to simplification, appreciable reduction of the number of devices required for reproduction is obtained since it is possible to utilise for all the records a common photocell and pre-amplifier. These advantages are greater according as the number of records on the carrier increases.

If, as is known in itself from French Patent Specification 885,556, use is made of the method of high-frequency scanning in order to reproduce the records without any noise, for example by means of a limiter, it is possible by carrying out the method according to the invention to obtain, moreover, a saving in the number of limiters since in this case for the common signal a single limiter may be utilized between the common pre-amplifier and the device wherein the signal is divided into its components.

In one practical example of carrying out the method according to the invention, scanning is effected by optical means. To that end a scanning light beam is moved at high frequency in a direction perpendicular to the direction of travel of the carrier on which, for example, a stereophonic double-track is provided. The beam of light modulated successively with very small time intervals by each of the records falls on a single photocell. The current pulses thus combined to form one signal are pre-amplified and, as the case may be, deprived, in the manner known from the above-mentioned French patent specification, for example by means of a limiter, of the amplitude distortion which gives rise to the back-ground noise, whereupon this signal, according to the number of scanned records, is divided into the two stereophonic components.

In another example of carrying out the method according to the invention, an optical image of the record, which, for example, may also be a stereophonic double-track, is formed on the image cathode of a so-called "image dissector tube" and the electrical image thus formed is scanned at a high frequency rate. The signal obtained is pre-amplified and then, in a similar manner as indicated above, divided again into the two stereophonic components.

The method according to the invention will be explained more fully with reference to the accompanying diagrammatic drawing which represents a few embodiments of the devices to be used.

Figure 2:
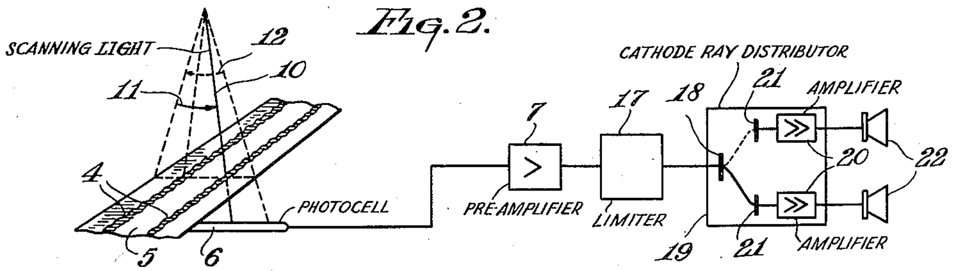
Fig. 2 represents a device for carrying out the method according to the invention, wherein a stereophonic double-track is optically scanned at high frequency.
Figure 3:
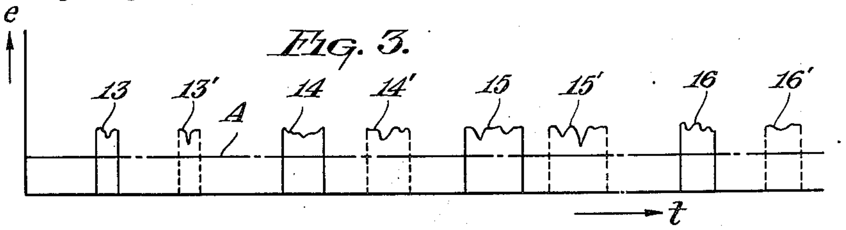

Fig. 3 graphically represents the signal which has passed the pre-amplifier of Fig. 2.

Figure 4:
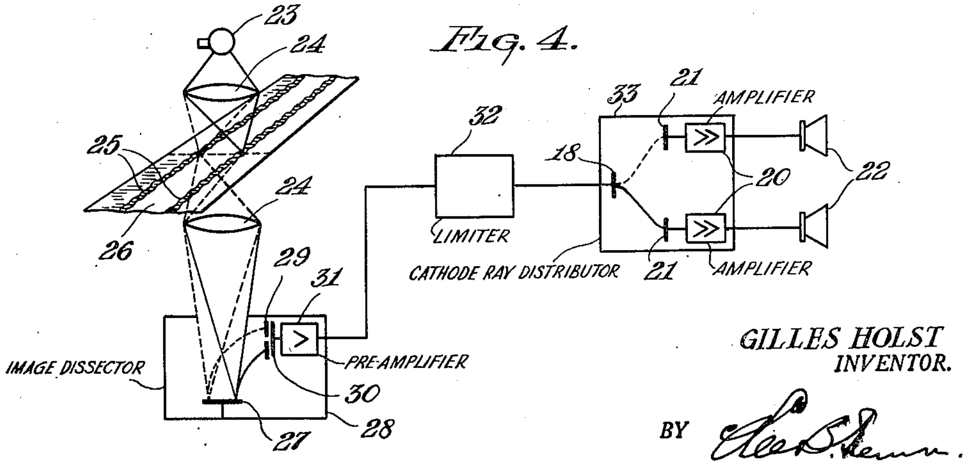

Fig. 4 shows the device for carrying out the method according to the invention wherein an electrical image of a stereophonic double-track is scanned.

Figure 1:
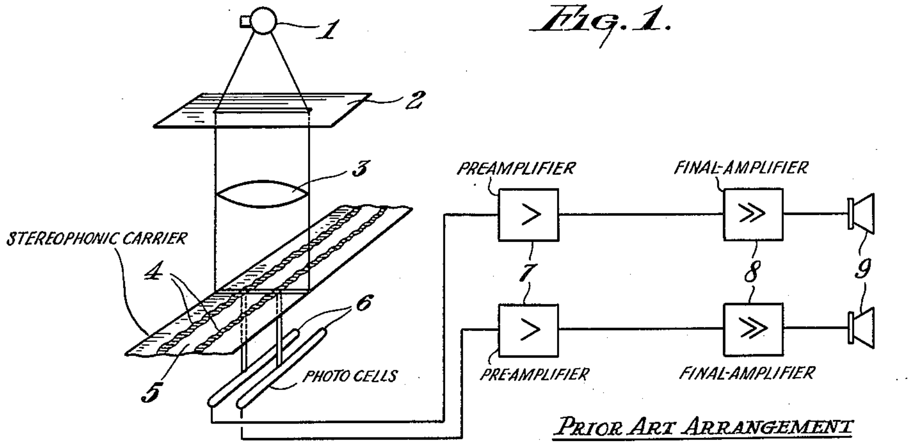
Fig. 1 represents a known device for jointly scanning by optical agency, for example, a stereophonic double-track.

The light emitted by a projection lamp 1 in Fig. 1 passes through a slit-shaped diaphragm 2 and through a lens 3, resulting in the production of a narrow beam of light which scans a stereophonic double-track 4 provided on a carrier 5. The light modulated by the records 4 is intercepted by photocells 6 and transformed by the latter into electric current variations which are led through separate channels successively via pre-amplifiers 7 and final amplifiers 8 to loudspeakers 9.

Referring to Fig. 2, the two stereophonic records 4 of the carrier 5 are successively scanned, in accordance with the invention, by a beam of light 10 moving at a high frequency rate. The light modulated by the records 4 is intercepted by a single photocell 6 and transformed by the latter into electric current pulses, whereupon this signal is passed on to a common pre-amplifier 7. The signal which has passed the pre-amplifier 7 is represented in Fig. 3 wherein the voltage of this signal is plotted as a function of time for the case wherein scanning is effected only in one direction perpendicular to the direction of travel of the records, as indicated in Fig. 2 for the sake of clearness by an arrow 11.

The pulses 13, 13′, 14, 14′ etc. originating respectively from one of the two stereophonic records 4, occur therein pair-wise. It is evident that the scanning may also take place in both directions perpendicular to the direction of travel of the records (see arrow 12), which results in that the pulses 13, 13′, 15, 15′ etc. or the pulses 14, 14′ 16, 16′ change their places.

Imperfection, soiling and damage of the carrier material become manifest by diminution of the intensity of the light falling upon the photocell 6 owing to which variations in the amplitude of the block signal are produced. The width of the block signal depends on the duration of each pulse and constitutes an index to the amplitude of the oscillation to be reproduced. The signal then passes through a limiter 17 which may be of the type described in the above-mentioned French patent specification owing to which the amplitude distortion arising from the background noise is eliminated since this device is only responsive to the variations in width of the block signal with the maximum amplitude which is represented by line A in Fig. 3.

Subsequently, the signal is led to a cathode 18 of a device 19 in which a multi-anode cathode ray deflection "beam tube" is combined with two amplifiers 20 to form a single unit. The cathode activated by the pulses 13 and 13′ etc. emits electrons which are deflected, in synchronism with the scanning frequency, alternately to either of two anodes 21 of the device 19, which anodes are connected to the respective input circuits of the amplifiers 20, the pulses 13, 14, 15, etc. and the pulses 13′, 14′, 15′, etc. of the common signal, originating from the two sterophonic tracks, being thus separated. Subsequently they are stereophonically reproduced without any noise by means of loudspeakers 22.

Upon comparison of Figures 1 and 2 it will be seen that by carrying out the invention economy in the number of photocells and pre-amplifiers required for reproduction is obtained, which economy is greater according as the number of records provided on the carrier increases.

It may also be seen from Fig. 2, that a similar economy may be obtained in the number of limiters in comparison with the case wherein the two records are scanned each separately at high frequency.

In Fig. 4 an image of stereophonic records 25 provided on a carrier 26 is thrown, by means of a projection lamp 23 and lenses 24, on a photocathode 27 of an "image tube" 28. An example of this type of tube may be found in the text "Radio Engineering" of F. E. Terman, 3rd Edition, page 830. The electron beam emitted by the photocathode 27 is moved at a high frequency rate in the known manner over the opening of a collecting screen 29. The electrons which are allowed to pass fall on an anode 30 which is coupled with the input circuit of a pre-amplifier 31 which is common to both records. The signal thus obtained, which has a shape similar to that shown in Fig. 3, is led successively to an amplitude limiter 32 and an amplifying device 33 as shown in Fig. 2 wherein the signal is deprived from any noise and is divided into its composing components, the signal being subsequently stereophonically reproduced by means of the loudspeakers 22.

What I claim is:

1. In stereophonic apparatus for the separate electrical reproduction of a plurality of light transmitting oscillation tracks of variable light permeability, the tracks lying in parallel relation along a carrier arranged for continuous movement, the combination comprising means to scan successively said tracks in a direction normal to the direction of carrier movement periodically at a high frequency to produce successive voltage pulses whose widths depend on the respective light transmission characteristics of said tracks, a like plurality of electrical reproducing channels, and distributor means to apply said pulses sequentially to said channels in synchronism with the successive operation of said scanning means.

2. In stereophonic apparatus for the separate electrical reproduction of a plurality of light transmitting oscillation tracks of variable light permeability, the tracks lying in parallel relation along a carrier arranged for continuous movement, the combination comprising means to scan successively said tracks in a direction normal to the direction of carrier movement periodically at a high frequency to produce successive voltage pulses whose widths depend on the respective light transmission characteristics of said tracks, a like plurality of electrical reproducing channels, an amplitude limiter, means to impress said successive pulses as an input to said limiter to develop output pulses of constant amplitude, and distributor means to apply the limited pulses sequentially to said channels in synchronism with the successive operation of said scanning means.

3. In stereophonic apparatus for the separate electrical reproduction of a plurality of light transmitting oscillation tracks of variable light permeability, the tracks lying in parallel relation along a carrier arranged for continuous movement, the combination comprising a photoelectric device arranged to intercept light transmitted through said tracks, means to successively illuminate said tracks in a direction normal to the direction of carrier movement to produce successive voltage pulses in said device whose widths depend on the respective light transmission characteristics of said tracks, a like plurality of electrical reproducing channels, and distributor means to apply the pulses developed by said device sequentially to said channels in synchronism with said scanning means.

4. In stereophonic apparatus for the separate electrical reproduction of a plurality of light transmitting sound tracks of variable light permeability, the tracks lying in parallel relation along a carrier arranged for continuous movement, the combination comprising a photoelectric device arranged to intercept light transmitted through said tracks, means to successively illuminate said tracks in a direction normal to the direction of carrier movement to produce successive voltage pulses in said device whose widths depend on the respective light transmission characteristics of said sound tracks, a cathode-ray beam tube provided with a plurality of spaced anodes and deflection means, means to modulate the intensity of said beam with the successive pulses produced by said device, means to deflect said beam in synchronism with said scanning operation to cause said beam to strike a respective anode in concurrence with the scanning of a respective track, and a plurality of sound reproducing channels each coupled to a respective anode to receive the pulses developed thereon.

5. In stereophonic apparatus for the separate electrical reproduction of a plurality of light transmitting sound tracks of variable light permeability, the tracks lying in parallel relation along a carrier arranged for continuous movement, the combination comprising a photoelectric device arranged to receive light through said tracks, means to successively illuminate said tracks in a direction normal to the direction of carrier movement to produce successive voltage pulses in said device whose widths depend on the respective light transmission characteristics of said sound tracks, a cathode ray beam tube provided with a plurality of spaced anodes and deflection means, means to modulate the intensity of said beam with the successive pulses produced by said device, means to deflect said beam in synchronism with said scanning operation to cause said beam to strike a respective anode simultaneously with the scanning of a respective track, a plurality of sound reproducing channels each coupled to a respective anode to receive the pulses developed thereby, and an amplitude limiter interposed between said photoelectric device and said cathode ray tube whereby said tube is modulated by constant amplitude pulses of varying width.

6. In stereophonic apparatus for the separate electrical reproduction of a plurality of light transmitting sound tracks of variable light permeability, the tracks lying in parallel relation along a carrier arranged for continuous movement, the combination comprising means to illuminate a narrow area of said tracks transverse to the direction of carrier movement, an image dissector tube having a photocathode, an output electrode arranged to receive a cathode ray beam from said photocathode and means to deflect said beam across said output electrode, means to project a light image of said illuminated tracks on said photocathode, means to deflect said beam across said output electrode at a rapid rate to produce successive pulses at said output electrode whose widths depend on the respective light transmission characteristics of said tracks, a plurality of electrical reproducing channels, and distributor means to apply the pulses developed at said output electrode sequentially to said channels in synchronism with said deflection operation whereby the pulses derived from the respective tracks are applied to separate channels.

GILLES HOLST.

REFERENCES CITED

The following references are of record in the file of this patent:

UNITED STATES PATENTS

| Number | Name | Date |
|---|---|---|
| 2,191,565 | Henroteau | Feb. 27, 1940 |
| 2,195,676 | McCarty | Apr. 2, 1940 |
| 2,249,606 | Frielus | July 15, 1941 |
| 2,287,965 | Borberg | June 30, 1942 |
| 2,303,456 | Hardenberg | Dec. 1, 1942 |
| 2,347,084 | Cooney | Apr. 18, 1944 |
| 2,352,696 | DeBoer et al. | July 4, 1944 |
| 2,367,277 | Henroteau | Jan. 16, 1945 |
| 2,414,666 | Poulsen | Jan. 21, 1947 |
| 2,415,981 | Wolff | Feb. 18, 1947 |